R. R. LAWRENCE.
Canisters for Tea, Coffee, &c.
No. 152,293.                                    Patented June 23, 1874.
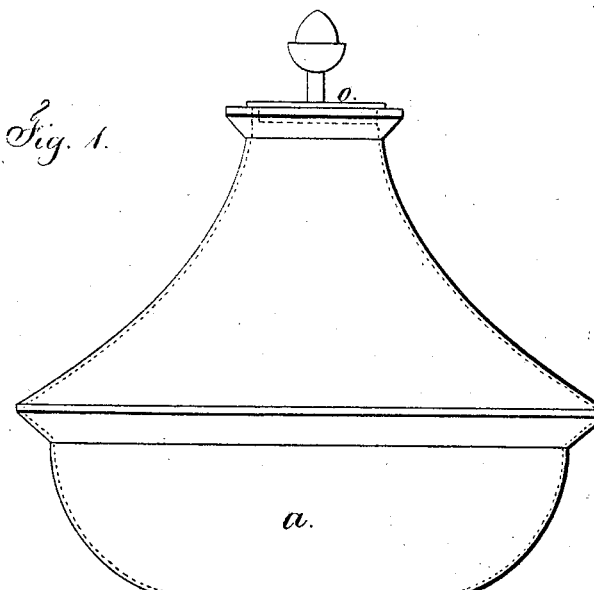
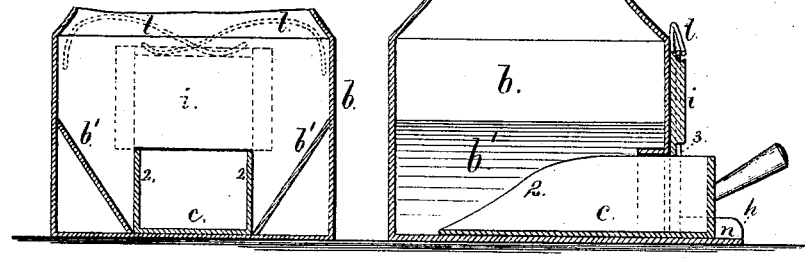
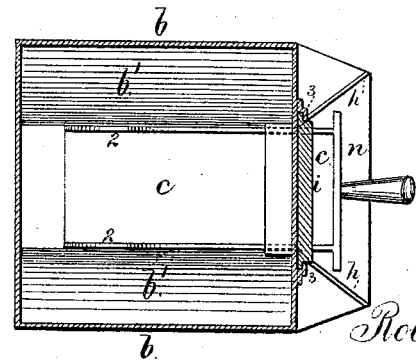

UNITED STATES PATENT OFFICE.

ROBERT R. LAWRENCE, OF NEW YORK, N. Y., ASSIGNOR TO S. A. ILSLEY & CO., OF SAME PLACE.

IMPROVEMENT IN CANISTERS FOR TEAS, COFFEES, &c.

Specification forming part of Letters Patent No. 152,293, dated June 23, 1874; application filed May 5, 1874.

*To all whom it may concern:*

Be it known that I, ROBERT R. LAWRENCE, of the city and State of New York, have invented an Improvement in Canisters for Tea, Coffee, &c., of which the following is a correct description:

Canisters for tea and coffee are usually open at the top, and hence the materials are removed through the top. In scooping out tea the fine dust works down to the bottom, and is ultimately a loss, and with coffee and some other materials it is desirable to exclude them as much as possible from the action of the atmosphere.

My improvement is made for the purpose of removing the tea or other material from the bottom of the canister, and at the same time excluding the atmosphere, and for taking away at each operation a measured quantity, so that the material may be sold by measure, or poured from the receptacle into a scale.

I employ a scoop with inclined sides that act as cams to raise a gate when such scoop is pressed into the bottom of a canister by passing the same below the said gate or cut-off, and when the scoop is drawn out the gate or cut-off scrapes the surplus material from the scoop and retains the remainder of the contents of the canister as the scoop is drawn out from beneath such cut-off. A spring or weight presses the cut-off down as the scoop is withdrawn.

In the drawing, Figure 1 is a vertical section of the canister and scoop. Fig. 2 is a sectional plan with the scoop partially withdrawn, and Fig. 3 is a cross-section of the base.

The canister is of any desired size or shape. I prefer and use an urn, $a$, contracted to the base $b$, in which are inclined sides $b'$, to direct the tea or other material into the path of the scoop $c$. This scoop $c$ is made in the form of a drawer without a back, and with the sides 2 inclined at the back ends, so as to form cams. The base of the canister is made with an opening in one side large enough for the scoop $c$ to be entered horizontally, and at the sides of this opening are slides 3 3, in which the gate or cut-off $i$ slides vertically, as the scoop is entered or withdrawn beneath such cut-off. I prefer and use the springs $l$ to press the gate downward, but the gate may be weighted for the same purpose. The tray $n$ projecting in front of the cut-off serves to catch any particles that may fall, and ribs $h$ may be used on this tray to direct the scoop to place as it is pressed in.

It is to be understood that when the scoop is pushed into place its back end passes under the gate, and the cam-sides raise such gate; and when the scoop is withdrawn, the cut-off scrapes away and holds back the material in the canister, so that such material will not overflow the scoop, and the opening will be closed as the scoop is removed. By this means the scoop becomes a measure, and, if the tea or other material is sold by weight, the scoop conveys the same to the scale, and surplus material may be poured back into the canister by removing the top $o$; or the scoop may be replaced with part of the contents.

I claim as my invention—

The canister made with an opening at its side and a vertically-sliding gate, in combination with the scoop having cam-shaped sides, as and for the purposes set forth.

Signed by me this 30th day of April, A. D. 1874.

ROBERT R. LAWRENCE.

Witnesses:
GEO. T. PINCKNEY,
CHAS. H. SMITH.